Patented Feb. 18, 1947

2,416,258

UNITED STATES PATENT OFFICE 2,416,258

3-(5-ETHOXY-3-INDOLYL)-PROPYL COMPOUNDS

Glenn L. Jenkins, West Lafayette, and Hubert W. Murphy, Indianapolis, Ind., assignors to Purdue Research Foundation, West Lafayette, Ind., a corporation of Indiana No Drawing. Application March 17, 1944, Serial No. 527,014

2 Claims. (Cl. 260—319)

Our invention relates to 3-(5-ethoxy-3-indolyl)-propyl compounds which are represented by the following formula:

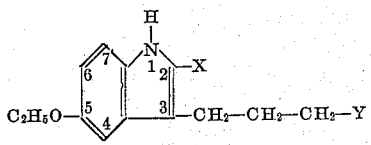

in which X represents a member of the class consisting of hydrogen, —COOC₂H₅, and

—COOH and Y represents a member of the class consisting of —NH₂,

in which R and R¹ represents alkyl groups having not to exceed seven carbon atoms, —NH₂·HCl, —NH₂·½H₂SO₄, —NH₂·CH₃COOH,

—NH₂·½HOOC—CH=CH—COOH

—COOH, —COOC₂H₅, —COOCH₃,

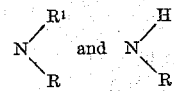

These compounds may be considered as consisting of 3-(5-ethoxy-3-indolyl)-propylamine, intermediates produced in preparing that compound, and acid-addition salts and mono- and di-alkylated compounds thereof on the propylamino nitrogen.

The 3-(5-ethoxy-3-indolyl)-propylamine has the following formula:

(2)

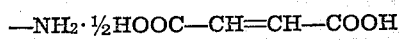

In preparing this amine, we first produce p-ethoxy-benzene-diazonium chloride; then by several procedural steps produce 4-(5-ethoxy-3-indolyl)-butanoyl azide; and then produce the amine from the azide.

The following is an example of this general procedure:

To a mixture of 11.27 g. of freshly distilled p-phenetidine and 20 cc. of concentrated hydrochloric acid (density 1.2), thoroughly stirred in a salt-and-ice bath, is slowly added 5 grams of sodium nitrite dissolved in 20 cc. of distilled water. Care is taken that the temperature does not rise above 4° C., as by adding crushed ice. Diazotization occurs, to produce p-ethoxy-benzene-diazonium chloride in solution.

This solution is kept cold, and is added in successive small amounts to a cold mixture of 13.6 g. of 2-carbethoxy-cyclohexanone and 100 g. of crushed ice, with the additions of the diazonium chloride interspersed with additions of sufficient amounts of a cold solution of 20 g. of potassium hydroxide in 50 cc. of distilled water to maintain the whole always alkaline. The formation of localized regions of appreciable acidity is prevented by mechanical agitation; and crushed ice is added as required to maintain the temperature of the reaction mixture as near 0° C. as possible.

When these additions have been completed, the reaction mixture is stirred for about 20 minutes, and until the potassium salt of the 2-carbethoxy-cyclohexanone (which is formed and in part precipitated in the reaction) has gone into solution. Then the reaction mixture is made acidic, desirably by the addition of a mixture of 16 cc. of concentrated hydrochloric acid and 80 g. of ice. At this point a viscous reddish-brown oil begins to separate, and most of it collects on the mechanical agitator. The agitation is stopped, and this oily substance is carefully separated from the acidified mixture, most conveniently by simply lifting out the agitator; from which it is scraped, and then washed at least twice with cold distilled water. This oily substance, on standing, forms a crystalline mass—the crystal formation may be facilitated by stirring with a glass rod. The crystalline mass is broken up; and is suitably dried, as in a vacuum desiccator. These crystals are 1-(p-ethoxy-phenyl-hydrazone)-1-carbethoxy-5-carboxypentane; which is new with us, and which has the following formula:

(3)

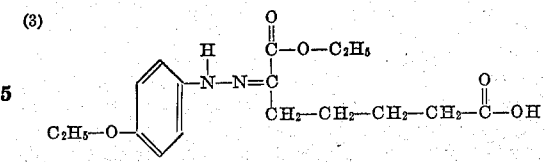

The yield of this crude hydrazone, with the quantities used, is about 27 grams.

The crude hydrazone may be purified if desired, as by recrystallization. This is conveniently done by dissolving it in hot benzene, treating the benzene solution with activated charcoal, filtering, and chilling the filtrate in ice; upon which lemon yellow prisms of the purified hydrazone separate, and are suitably collected and dried. The purified hydrazone melts at about 114° C.

Either the crude or the purified hydrazone may be used for the next step; which involves closing the ring to form the indole nucleus. If the crude hydrazone is used, 25 grams of it are added to a previously prepared mixture of 10 cc. of concentrated sulfuric acid and 100 cc. of absolute ethyl alcohol. The resultant mixture is refluxed for about two and one-half hours, after which the excess alcohol is desirably distilled off at low pressure, conveniently about 20 to 25 mm. The residue is dissolved in from 200 to 225 cc. of a mixture of one part benzene and two parts ether; and about 120 to 140 cc. of water is added, and the whole is first thoroughly stirred and then allowed to stand. Upon the standing the mass separates into a lower water layer and an upper benzene-ether layer; whereupon the two layers are separated, and the water layer discarded. The separated benzene-ether layer is desirably washed several times, alternately with saturated sodium bicarbonate solution and distilled water; the washings are discarded; and then the washed benzene-ether layer is dried, as by adding anhydrous sodium sulfate, and then subjected to distillation under reduced pressure to remove the ether and benzene and to leave a solid residue. This residue is dissolved in about 100 cc. of hot ethyl alcohol; about 100 cc. of distilled water is added; and the mixture is first heated to boiling, then allowed to cool to room temperature, and then chilled. On the chilling, a deposit of brownish flat needles occurs, over a brown sludge in the bottom of the flask. These needles are suitably collected, and dried. The dried needles are dissolved in a mixture of equal parts of acetone and water, desirably with gentle heating. The solution so obtained is chilled in a salt-and-ice bath; upon which crystals form, and are suitably collected. By repeated recrystallization, the ester may be obtained in a practically pure state—as faintly buff colored, glistening, flat needles. The crystals so obtained melt at about 93° C.; contain the complete indole nucleus; and are the desired diethyl ester of 4-(2-carboxy-5-ethoxy-3-indolyl)-butanoic acid, or 2-carbethoxy-5-ethoxy-3-(3-carbethoxy-propyl)-indole, which has the following formula:

(4)

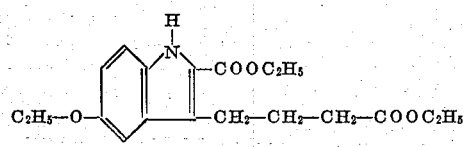

This diethyl ester is now de-esterified, and converted to the corresponding disodium salt. This is conveniently done by adding it to approximately ten times its weight of an alcohol solution containing a fairly high concentration of an alkaline sodium compound, such as sodium hydroxide or (better) sodium ethoxide, and allowing the mixture to stand for several hours at room temperature. The sodium salt separates, and is suitably collected, as by filtration; and the collected salt is washed with alcohol, and then dissolved in distilled water. To the solution so formed is added a slight excess of an acid, conveniently hydrochloric acid; which precipitates the desired dibasic 4-(2-carboxy-5-ethoxy-3-indolyl)-butanoic acid, or 2-carboxy-5-ethoxy-3-(3-carboxy-propyl)-indole, which has the following formula:

(5)

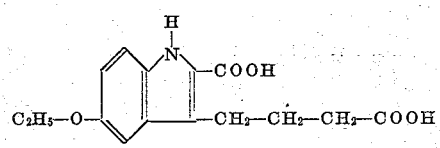

This may be purified by dissolving in a hot mixture of 50% each of glacial acetic acid and water, filtering the solution while hot, and chilling over-night to promote crystallization of the acid. Two such crystallizations give a fairly pure product. This consists of a fine, white, microcrystalline powder, which when dried melts at 260° C.

This dicarboxylic acid is not very soluble in hot water; and in fact is far less soluble than is the mono-carboxylic acid which is derived from it as hereinafter set forth.

This dicarboxylic acid is now treated to remove the carboxyl group at the 2 position on the indole nucleus. This may be done by heating it to about 220° to 230° C., desirably in the presence of powdered glass. At that temperature the dicarboxylic acid melts, and carbon dioxide is evolved—an evolution which is catalyzed by the presence of the powdered glass. The heating is continued for about an hour, and until the evolution of carbon dioxide has practically ceased. Then the molten residue is cooled, and treated with 50 volumes or more of hot distilled water. The aqueous mixture so obtained is maintained at boiling temperature for about fifteen minutes, with constant stirring; and is then filtered while hot. The aqueous filtrate, which contains the desired monobasic acid, is chilled in the ice chest, and the monobasic acid separates from it on that chilling. This monobasic acid may be purified by several crystallizations from distilled water. The crystallized monobasic acid, after drying (as over anhydrous calcium chloride), is obtained as white needles, which melt at about 133° C. The monobasic acid has the following formula:

(6)

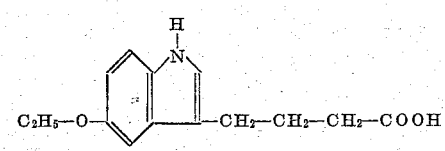

An alkyl ester is now prepared from this monobasic acid. Desirably the ester is either the methyl ester or the ethyl ester, produced by treatment with either methyl alcohol or ethyl alcohol; in either case desirably with added hydrogen chloride. Either ester is obtained as fine white needles. The ethyl ester melts at about 69° C., and the methyl ester at about 84° C.

Either the methyl ester or the ethyl ester may be used to produce the corresponding hydrazide. This may be done by treating the ester with hydrazine hydrate, desirably with some ethanol added. If the methyl ester is used, about 41 grams of it are treated with about 37 grams of 40% hydrazine hydrate and 45 cc. of ethanol. The mixture is gradually heated in an oil bath, under reflux, until the temperature reaches about 130° C., and is then allowed to reflux at that temperature for about an hour; after which the condenser used in the refluxing is removed and the temperature is raised to about 140–150° C., which produces the evaporation of most of the water and alcohols, and of the excess of hydrazine hydrate. The residue solidifies upon cooling;

and is broken up, and washed first with cold water and then with cold ethanol, after which it is recrystallized from ethanol with the aid of activated charcoal. The crystals obtained are fine white prisms, which melt at 157° C.; and are the desired 4 - (5-ethoxy-3-indolyl) - butanoyl hydrazide; which has the following formula:

(7)
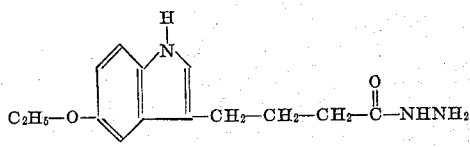

The hydrazide is next converted to the azide. This is done by dissolving about 6.5 grams of the hydrazide in a suitable solvent, such as glacial acetic acid, cooling to 0° C., and gradually adding (with stirring) about 1.74 grams of sodium nitrite dissolved in 3 cc. of water. This produces the azide; which crystallizes out, is collected on a filter, and is washed with ice-cold water. The crystals so obtained are the desired 4-(5-ethoxy-3-indolyl)-butanoyl azide, which has the following formula:

(8)
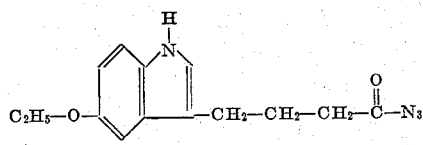

This azide is now converted into the desired alkyl amine. This is done by adding about 6 grams of the azide in small portions—as of 100 to 300 milligrams each—to 100 cc. of 50% acetic acid maintained at about 95° C. Nitrogen is evolved on each addition, and the next portion is not added until that evolution has substantially stopped. After the final addition of the azide, the liquid is kept heated for about 40 minutes longer; after which the water and excess acetic acid are removed by distillation under reduced pressure, which leaves as a residue the acetate of the desired alkyl amine. The residue is dissolved in about the minimum quantity of water; and the solution is made alkaline, as with sodium hydroxide, to convert the acetate to the free amine of formula 2. This amine is then extracted from the solution, as with ether—desirably in several extractions, with combining of the ethereal extracts. The combined ethereal extract is then suitably dried, as by adding potassium hydroxide; after which the liquid is filtered, and the amine is precipitated (in the form of its hydrochloride) from the dry ethereal solution by saturating it with dry hydrogen chloride. This hydrochloride is collected on a filter; and purified by recrystallization, as from an acetone-alcohol mixture. This gives crystals which melt at about 205° C. These crystals are 3 - (5 - ethoxy-3-indolyl) - propylamine hydrochloride, which has the following formula:

(9)
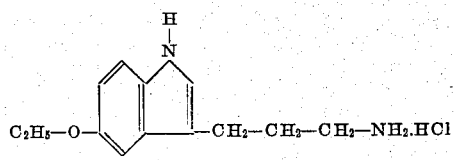

This hydrochloride, and the free 3-(5-ethoxy-3-indolyl)-propylamine which can readily be obtained from it by dissolving the hydrochloride in water and adding just enough sodium hydroxide to neutralize the hydrochloric acid—as well as other salts, such for instance as the sulfate and the maleate—are found to be effective oxytocic compounds, but in therapeutic doses to be substantially free from pressor effects. We prefer the hydrochloride or the maleate.

The propyl-amine of formula 2 may be alkylated, by any suitable alkylation procedure, to produce either mono-alkylation or di-alkylation; and thus to substitute for either or both hydrogens on the terminal amino group of the alkyl amine any desired alkyl group containing not more than 7 carbon atoms. Such alkyl groups may be either straight-chain or branched-chain. Among them may be mentioned the methyl group, the ethyl group, the propyl group, the isopropyl group, various butyl groups, the 3-pentyl group, the 2-hexyl group, the 3-hexyl group, and the 2-heptyl group. These alkylated compounds have oxytocic properties.

We claim as our invention:

1. A 3-(5-ethoxy-3-indolyl)-propyl compound having the following formula:

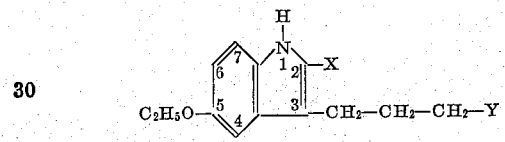

in which X represents a member of the class consisting of hydrogen, $-COOC_2H_5$, and $-COOH$; and Y represents a member of the class consisting of $-NH_2$,

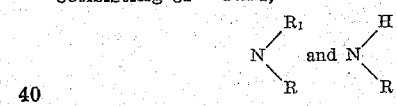

in which R and $R^1$ represent alkyl groups having not to exceed seven carbon atoms, $-NH_2 \cdot HCl$, $-NH_2 \cdot \frac{1}{2}H_2SO_4$, $-NH_2 \cdot CH_3COOH$, $-NH_2 \cdot \frac{1}{2}HOOC-CH=CH-COOH$, $-COOH$, $-COOC_2H_5$, $-COOCH_3$,

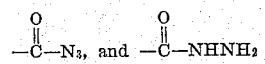

2. 3-(5-ethoxy-3-indolyl)-propylamine.

GLENN L. JENKINS.
HUBERT W. MURPHY.

REFERENCES CITED

The following references are of record in the file of this patent:

Manske et al.: J. Chem. Soc., 1927, pages 240–2. Cited in 21 Che. Abs., 1263 (1927). Copy in Div. 6.)

Buning: Rec. trav. Chim., 40, 327–53 (1921). Cited in 15 Chem. Abs., 3819 (1921).

Lindemann: Helv. Chim. acta, 11, 1027–8 (1928). Cited in 23 Chem. Abs. 827, 1928.

Van Order et al.: Chem. Rev., 30, 86 (1942), 260–319.

Fischer et al.: "Die Chemie des Pyrrols" (Leipzig, 1934): vol. I, pages 313–315, vol. II, part I, pages 568–9.

Murphy et al.: J. Am. Pharm. Assoc. 32, 83–89 (March 19, 1943), 260–319.